United States Patent [19]

Drain

[11] Patent Number: 5,024,414

[45] Date of Patent: Jun. 18, 1991

[54] STABILIZING DEVICE FOR HAND-HELD/PORTABLE ELECTRONIC DEVICE

[76] Inventor: Dennis R. Drain, P.O. Box 95741, Oklahoma City, Okla. 73143

[21] Appl. No.: 484,812

[22] Filed: Feb. 26, 1990

[51] Int. Cl.⁵ .......................................... F16M 13/00
[52] U.S. Cl. ..................................... 248/688; 248/346
[58] Field of Search ..................... 248/688, 346, 188.7, 248/188.8

[56] References Cited

U.S. PATENT DOCUMENTS

| | | | |
|---|---|---|---|
| 2,235,839 | 3/1941 | McEnery | 248/688 |
| 2,388,567 | 11/1945 | Patterson, Jr. | 248/688 |
| 3,155,362 | 11/1964 | McCall | 248/688 |
| 3,286,969 | 11/1966 | Frescobaldi | 248/688 |
| 4,113,212 | 9/1978 | Coriden | 248/688 X |
| 4,169,417 | 10/1979 | Gemvik | 248/346 X |
| 4,545,556 | 10/1985 | Buist et al. | 248/346 |
| 4,635,811 | 1/1987 | Lodi | 248/346 X |

Primary Examiner—Gary L. Smith
Assistant Examiner—Michael J. Milano
Attorney, Agent, or Firm—Laney, Dougherty, Hessin & Beavers

[57] ABSTRACT

This invention is a device that fits on the bottom of units such as portable police scanners, walkie-talkies, and police radios. The stabilizer, as it is called, attaches securely to the bottom of the radio unit. The stabilizer is made in two layers. The top layer is securely attached to the radio unit. The bottom layer of the stabilizer is made in two pieces. Both pieces are attached to the top layer with rivets or other pivoting fasteners. The bottom layer, called legs, is pivoted into approximately a 45° angle from the top layer. This is used to give the radio unit a broader base to stand on; therefore, it will not tip over easily.

2 Claims, 1 Drawing Sheet

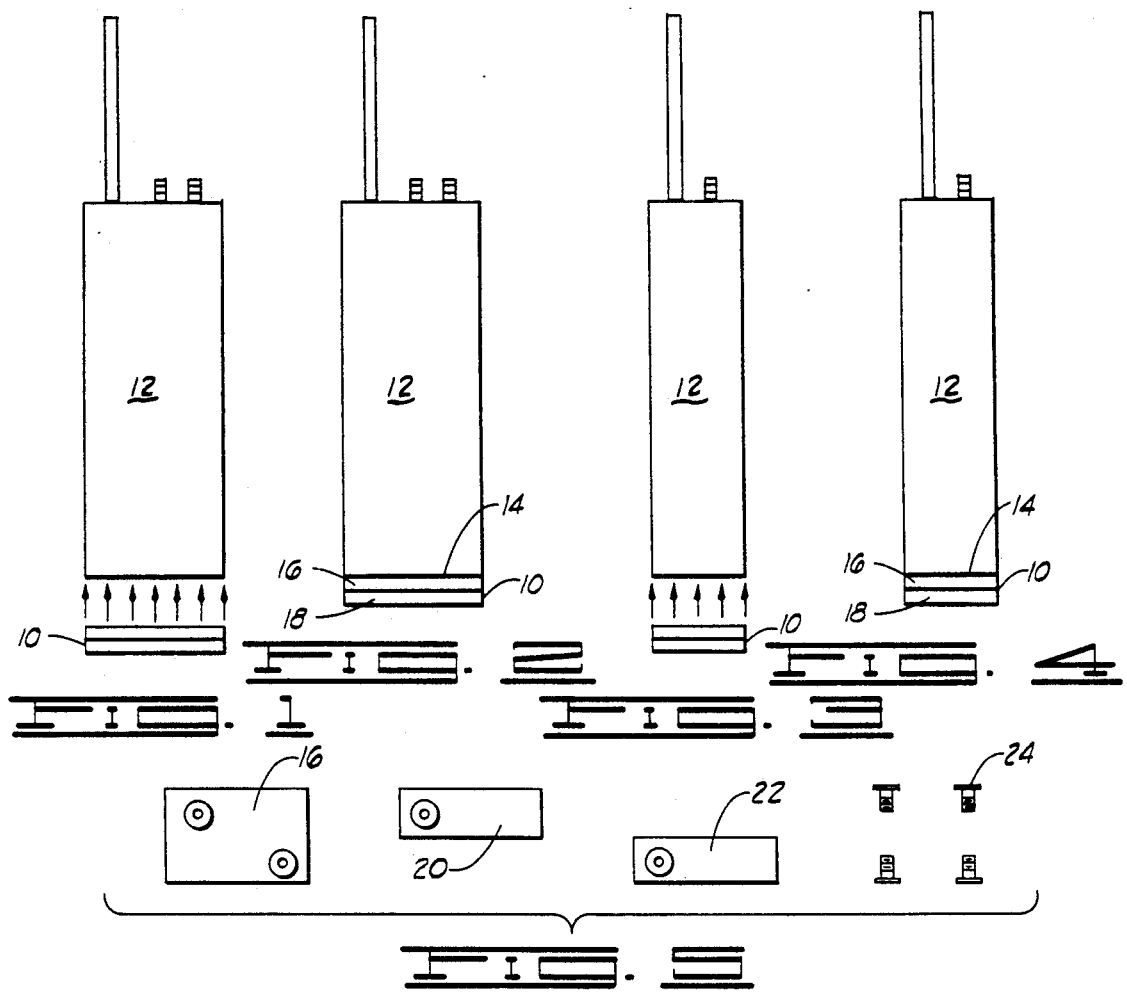
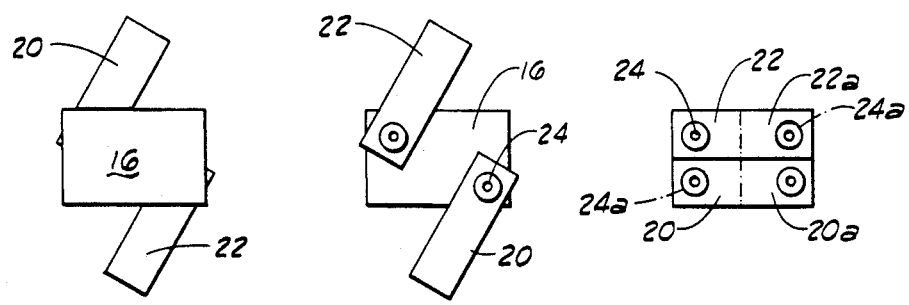
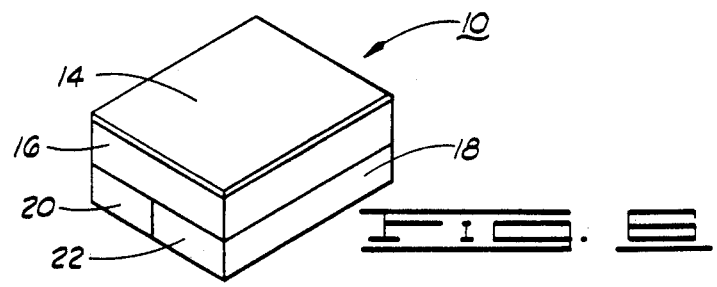

STABILIZING DEVICE FOR HAND-HELD/PORTABLE ELECTRONIC DEVICE

BACKGROUND OF THE INVENTION

1. Field of the Invention

The present invention relates to an accessory for hand-held/portable electronic equipment such as, but not limited to, walkie-talkies, scanners, hand-held radios. More specifically, the present invention relates to a device used to balance the weight of the said electronic device, thus preventing the electronic device from tipping over.

2. Prior Art

Hand-held police radios, scanners and other electronic devices are easily tipped over. Manufacturers of said products have attempted to address this problem by adding a U-shaped support to help add balance. This has not solved the problem. This support does not broaden the base enough to add the needed balance.

SUMMARY OF THE INVENTION

This invention is a device that fits on the bottom of units such as, but not limited to, portable scanners, walkie-talkies, police radios and other objects that are taller than wide causing top-heaviness. The said piece is attached to the unit by double-sided tape, nylon self gripping fasteners or glue, or can be made onto the unit. The piece is made in two layers. The uppermost layer is securely attached to the unit. The bottom layer consists of two pieces, each half as wide as the top layer. The bottom layer attaches to the top layer by means of lock posts, rivets or other such fastening device, each half attaching at opposite ends. The bottom layer pivots out on each side—front and back—of the unit to form approximately a 45° angle with the top layer. This gives the unit a broader base to stand on and distributes the top-heavy weight of the unit. The principle object of the present invention is to provide a devise for use in stabilizing radios, scanners, and other objects.

It is also an object of the present invention to provide such a device of simple design and inexpensive construction. Another object is to provide the present invention in a lightweight, complementary form that will be unobtrusive when in use.

The foregoiing objects can be accomplished by providing the aforementioned stabilizer in a lightweight material of a neutral or complementary color.

BRIEF DESCRIPTION OF THE DRAWINGS

FIG. 1 shows a front view of a police radio and the stabilizer.

FIG. 2 shows the same front view exploded as FIG. 1, with the stabilizer firmly attached to the radio.

FIG. 3 shows a side view of a radio and the stabilizer.

FIG. 4 is the same side view exploded as FIG. 3 with the stabilizer firmly attached. FIG. 5 shows the Disassembled Parts of the stabilizer.

FIG. 6 shows the Assemblage in a top perspective view.

FIGS. 7A and 7B shows top and the bottom views of the stabilizer in the "open" position.

FIG. 8 shows a bottom view of the stabilizer in the "closed" position.

DETAILED DESCRIPTION

Referring to FIGS. 1-5, a stabilizer device 10 is designed for securing to the bottom of a unit or electronic device 12 to enable secure upright placement. The device 10 includes gripper or fastener 14 secured on a top layer 16 that is pivotally affixed to a bottom layer 18. As shown in FIGS. 6, 7A, 7B and 8, bottom layer 18 is made up of two pieces or legs 20 and 22, each half as wide as top layer 16, with legs 20 and 22 each being pivotally affixed to top layer 16 by posts or rivets 24.

In operation, refer now to FIG. 7B which is a bottom view of a preferred embodiment of the invention. The two parts 20, 22 of the bottom layer 18 are attached to the top layer 16 by means of lock posts, rivets, or some other pivoting connector 24. The top layer 16 is attached firmly to the radio equipment, or other device, with a fastener 14 such as glue, double-sided tape, nylon self-gripping fasteners or the like. The user then pivots the bottom layer 18, henceforth referred to as legs 20 and 22, outward to produce a wide base to support the radio or other device. When not in use, the legs are returned to their closed position to be unobtrusive.

Another embodiment includes legs that are shorter than the top layer. The bottom layer is the same length as the top layer; however, the legs are cut shorter and the remaining pieces of the bottom layer are firmly attached to the bottom of the top layer. Another embodiment of the invention as shown in FIG. 8 includes a bottom layer that is made up of four legs 20, 20a 22 and 22a, each one-quarter the size of the top layer thus providing four legs that fold out rather than two.

Other embodiments include a top or bottom layer of different shapes, including, but not limited to, squares, rectangles, triangles.

The stabilizer provides a solid base to more fully balance the weight of the said electronic device to keep it from tipping over. By making the stabilizer from an inexpensive material such as plexiglass or other plastic in a neutral color, it can be made inexpensively and it will be unobtrusive.

The foregoing description of the preferred embodiment of the invention has been presented for the purposes of illustration and descripton. It is not intended to be exhaustive or to limit the invention to the precise form disclosed. Many modifications and variations are possible in light of the above teaching. It is intended that the scope of the invention be limited not by this detailed description, but rather by claims appended hereto.

What is claimed is:

1. A stabilizer device for attachment to the bottom of an electronic unit to provide upright stability, comprising:

an upper layer member having opposite ends, top and bottom;

means secured on the top of the upper layer for affixure to the unit bottom; and a bottom layer consisting of two leg members each pivotally affixed at respective opposite ends of said upper layer member and each being pivotable outward in a plane parallel to the upper layer to form approximately a 45° angle with said upper layer member to increase the support stabilization of said unit.

2. A stabilizer device for attachment to the bottom of an electronic unit to provide upright stability, comprising:

an upper layer member having opposite ends, top and bottom;

means secured on the top of the upper layer for affixure to the unit bottom; and a bottom layer consisting of four leg members of equal size each pivotally affixed at space points on said upper layer member and each being pivotable in a plane parallel to the upper layer to extend outward from said upper layer member to increase the support stabilization of said unit.

* * * * *